US012792934B2

(12) United States Patent
Lai et al.

(10) Patent No.: US 12,792,934 B2
(45) Date of Patent: Nov. 10, 2026

(54) MAINTENANCE SERVICE RECOMMENDATION METHOD AND ELECTRONIC APPARATUS THEREOF AND RECORDING MEDIUM

(71) Applicant: Wistron Corporation, New Taipei City (TW)

(72) Inventors: Jyun-Hao Lai, New Taipei City (TW); Yi-Cheng Chen, New Taipei City (TW); Jesica Elizabeth Marchelina, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 587 days.

(21) Appl. No.: 18/471,309

(22) Filed: Sep. 21, 2023

(65) Prior Publication Data

US 2025/0045603 A1 Feb. 6, 2025

(30) Foreign Application Priority Data

Aug. 2, 2023 (TW) ................................ 112129033

(51) Int. Cl.
*G06N 5/022* (2023.01)
*G06N 7/01* (2023.01)

(52) U.S. Cl.
CPC ............... *G06N 5/022* (2013.01); *G06N 7/01* (2023.01)

(58) Field of Classification Search
CPC ................................ G06N 5/022; G06N 7/01
See application file for complete search history.

(56) References Cited

U.S. PATENT DOCUMENTS

2020/0151560 A1* 5/2020 Song ...................... G06N 3/047
2023/0050889 A1* 2/2023 Kumar Jaya Kumar .................... G06F 16/9027
2024/0231322 A1* 7/2024 Narayanan ......... G05B 23/0229
2024/0320521 A1* 9/2024 Kim ....................... G06N 5/022
2024/0330180 A1* 10/2024 Acharya ............. G06F 12/0802
2025/0005535 A1* 1/2025 Bandodekar ........... G06Q 10/20

FOREIGN PATENT DOCUMENTS

CN 103245911 8/2013
CN 105547717 5/2016
CN 103245861 6/2016
CN 115718802 2/2023

OTHER PUBLICATIONS

Ben-Gal, Irad. “Bayesian networks.” Encyclopedia of statistics in quality and reliability (2008). (Year: 2008).*
Qiu, Juan, et al. “A causality mining and knowledge graph based method of root cause diagnosis for performance anomaly in cloud applications.” Applied Sciences 10.6 (2020): 2166. (Year: 2020).*

* cited by examiner

*Primary Examiner* — Hal Schnee
(74) *Attorney, Agent, or Firm* — JCIPRNET

(57) ABSTRACT

A maintenance service recommendation method and electronic apparatus thereof are provided. Relevant data of a faulty machine is input into a probability graph model through an interactive interface, and a recommended factor is obtained. A search is performed in the knowledge graph to pick up multiple selected categories related to the recommended factor among multiple variable categories. Based on the importance of each selected category, a hierarchical structure diagram is established and displayed on the interactive interface.

19 Claims, 15 Drawing Sheets

| Function module | Mockingbird | Cyborg | Ratio |
|---|---|---|---|
| ⊟ FLASH/RTC | 0.001179 | 0.000380 | 3.09978 |
| D2501 | 0.001179 | 0.000380 | 3.09978 |
| ⊞ IO BOARD CONN | 0.018373 | 0.007946 | 2.31230 |
| ⊞ INT IO | 0.029764 | 0.025276 | 1.17754 |
| ⊞ ECIO | 0.000302 | 0.000261 | 1.15308 |
| ⊞ SEQUENCE | 0.001624 | 0.001559 | 1.04220 |
| ⊞ DISPLAY | 0.005634 | 0.006069 | 0.92831 |
| ⊞ CPU | 0.126210 | 0.145061 | 0.87004 |
| ⊞ POWER | 0.013919 | 0.021325 | 0.65273 |
| ⊞ DDR | 0.011160 | 0.031683 | 0.35224 |
| ⊟ GPU | 0.001939 | 0.008652 | 0.22416 |
| PU8602 | 0.001632 | 0.000538 | 3.03165 |
| PU8551 | 0.002917 | 0.006719 | 0.43410 |
| GPU1 | 0.001269 | 0.018697 | 0.06788 |
| Total | 0.018339 | 0.023407 | 0.78350 |

1000

MAINTENANCE SERVICE RECOMMENDATION METHOD AND ELECTRONIC APPARATUS THEREOF AND RECORDING MEDIUM

CROSS-REFERENCE TO RELATED APPLICATION

This application claims the priority benefit of Taiwan application serial no. 112129033 filed on Aug. 2, 2023. The entirety of the above-mentioned patent application is hereby incorporated by reference herein and made a part of this specification.

BACKGROUND

Technical Field

The disclosure relates to an artificial intelligence (AI) learning mechanism, and in particular relates to a maintenance service recommend action method and an electronic apparatus thereby and recording medium.

Description of Related Art

After a sale of a general electronic product, if the machine/product is damaged and needs to be repaired, the machine may be sent to the repair center. Maintenance engineers spend a lot of time manually checking to find the cause of damage. Therefore, a lot of time may be saved if the possible causes may be estimated by artificial intelligence algorithms.

SUMMARY

A maintenance service recommendation method and an electronic apparatus thereof and recording media are provided in the disclosure, in which inference and explainable prediction results may be provided.

A maintenance service recommendation method of the disclosure is adapted to be executed by using a processor, the maintenance service recommendation method includes the following operation. A trained probability graph model and a knowledge graph are provided. Relevant data of a faulty machine is input into the probability graph model and a recommended factor is obtained. The knowledge graph is configured to represent a correlation between multiple variable categories, each of the variable categories includes multiple factors, and the recommended factor is one of the factors included in a recommended category in the variable categories. A search is performed in the knowledge graph to pick up multiple selected categories related to the recommended factor among the variable categories. The selected categories include the recommended category to which the recommended factor belongs and one or more related categories within other variable categories that have direct correlation with the recommended category. Based on the importance of each of the selected categories, a hierarchical structure diagram is established and displayed on an interactive interface. The hierarchical structure diagram includes multiple hierarchies corresponding to the selected categories, each of the hierarchies has multiple nodes corresponding to the factors included in each of the selected categories.

In an embodiment of the disclosure, the maintenance service recommendation method further includes the following operation. Structural learning is performed on the probability graph model based on a training data set to obtain a knowledge graph. Parameter learning is executed on the probability graph model based on the training data set and knowledge graph. Cross-verification is executed on the probability graph model based on a testing data set.

In an embodiment of the disclosure, the step of establishing the hierarchical structure diagram includes the following operation. An inheritance relationship of the hierarchies is determined based on the importance of each of the selected categories.

In an embodiment of the disclosure, after the hierarchical structure diagram is established and displayed on the interactive interface, the method further includes the following operation. In response to a selection of one of the nodes included in the hierarchies, in the hierarchical structure diagram, a connection relationship is visually presented between the selected node and a corresponding parent node in previous hierarchy.

In an embodiment of the disclosure, in response to one of the nodes included in the hierarchies being selected, the method further includes the following operation. A node set included in next hierarchy of the selected node is expanded. Multiple representative nodes are selected from the node set and presented in the hierarchical structure diagram based on historical statistics of each of the nodes in the node set.

In an embodiment of the disclosure, the maintenance service recommendation method further includes the following operation. For each of the nodes presented in the hierarchical structure diagram, corresponding historical statistics are respectively displayed.

In an embodiment of the disclosure, after inputting the relevant data of the faulty machine into the probability graph model through the interactive interface, the method further includes the following operation. Multiple probability values of multiple factors included in the recommended category are calculated through the probability graph model. Multiple representative factors are taken from the factors in the manner of numerically high to low based on the probability values. In the interactive interface, the representative factors are sorted and displayed. A representative factor among the representative factors with the highest probability value is taken as a final recommended factor.

In an embodiment of the disclosure, the interactive interface includes a comparison page, and the maintenance service recommendation method further includes the following operation. A first factor and a second factor are selected in a first category of the variable categories through the comparison page, and a third factor is selected in a second category of the variable categories. The first factor and the third factor are input into the probability graph model, and multiple first probability values of multiple factors included in the third category of the variable categories are obtained through a first knowledge graph. The second factor and the third factor are input into the probability graph model, and multiple second probability values of multiple factors included in the third category are obtained through a second knowledge graph. The first probability values and the second probability values are displayed in the comparison page.

In an embodiment of the disclosure, the knowledge graph is a directed acyclic graph (DAG), and the probability graph model is established by adopting a Bayesian network.

An electronic apparatus of the disclosure includes a memory including a trained probability graph model and an interactive interface, and a processor coupled to a memory and configured to execute a maintenance service recommendation method.

Non-transitory computer-readable recording medium of the disclosure is configured to store a program code. When the program code is executed by a processor, the processor executes a maintenance service recommendation method.

Based on the above, the disclosure utilizes a trained probability graph model to estimate a recommended factor, and finds selected categories that are strongly related to the recommended factor based on a knowledge graph, and generates a hierarchical structure diagram. Based on this, relevant personnel may detect the cause of machine damage. Accordingly, it may not only be used to recommend or give prediction results, but also perform causal inference to further assist technical personnel in the service maintenance process.

DETAILED DESCRIPTION OF DISCLOSED EMBODIMENTS

Figure 1:
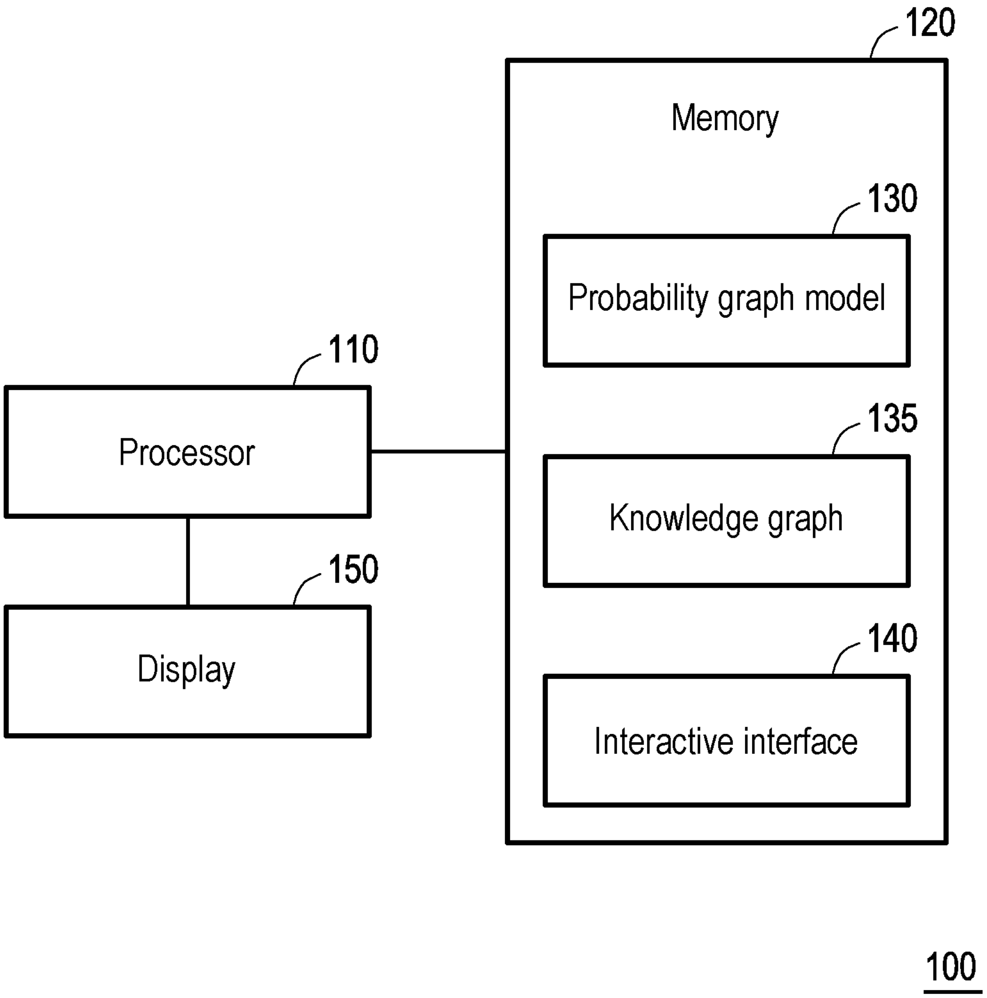
FIG. 1 is a block diagram of an electronic apparatus according to an embodiment of the disclosure.

FIG. 1 is a block diagram of an electronic apparatus according to an embodiment of the disclosure. Referring to FIG. 1, the electronic apparatus 100 includes a processor 110 and a memory 120. The memory 120 includes a probability graph model 130, a knowledge graph 135, and an interactive interface 140. In addition, the electronic apparatus 100 further includes a display 150 so that the processor 110 may display the interactive interface 140 on the display 150.

The processor 110 is, for example, a central processing unit (CPU), a physical processing unit (PPU), a programmable microprocessor, an embedded control chip, digital signal processor (DSP), an application specific integrated circuit (ASIC), or other similar devices.

The memory 120 is, for example, any type of fixed or removable random access memory (RAM), read-only memory (ROM), flash memory (Flash memory), a hard drive or other similar devices or a combination of these devices. The memory 120 further includes one or more program code segments. After the above program code segments are installed, the processor 110 executes the steps of the maintenance service recommendation method below.

The display 150 is, for example, a liquid crystal display (LCD), a plasma display, etc., and is configured to display the interactive interface 140.

Figure 2:
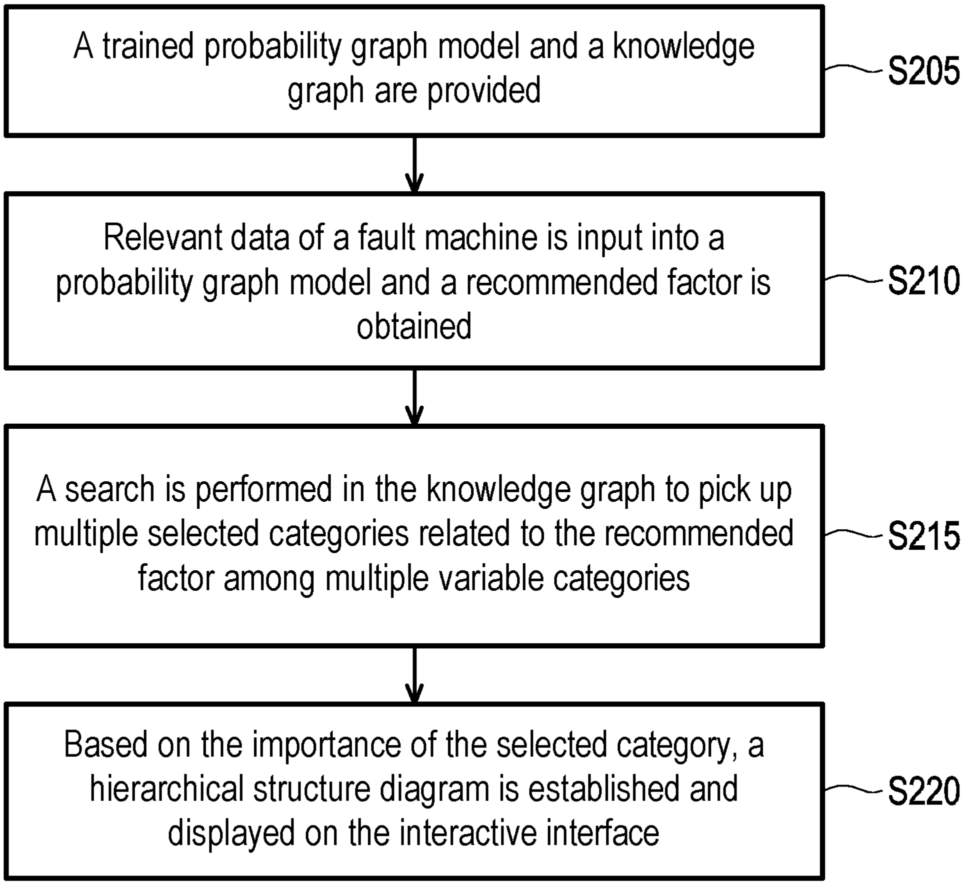
FIG. 2 is a flowchart of a maintenance service recommendation method according to an embodiment of the disclosure.

FIG. 2 is a flowchart of a maintenance service recommendation method according to an embodiment of the disclosure. Referring to FIG. 1 and FIG. 2 at the same time, in step S205, a trained probability graph model 130 and a knowledge graph 135 are provided. In one embodiment, a service maintenance data set is provided, and the service maintenance data set is split into a training data set and a testing data set. Next, structural learning is performed on the probability graph model 130 based on the training data set to obtain a knowledge graph 135. Moreover, based on the training data set and the knowledge graph 135, parameter learning is performed on the probability graph model 130. Afterwards, cross-verification is performed on the probability graph model 130 based on the testing data set.

In this embodiment, the probability graph model 130 is realized by adopting a Bayesian network, which may provide causes and explainable prediction results. The knowledge graph 135 is a directed acyclic graph (DAG). Here, bnlearn is used to learn the graph structure of Bayesian networks and to estimate parameters.

Figure 3:
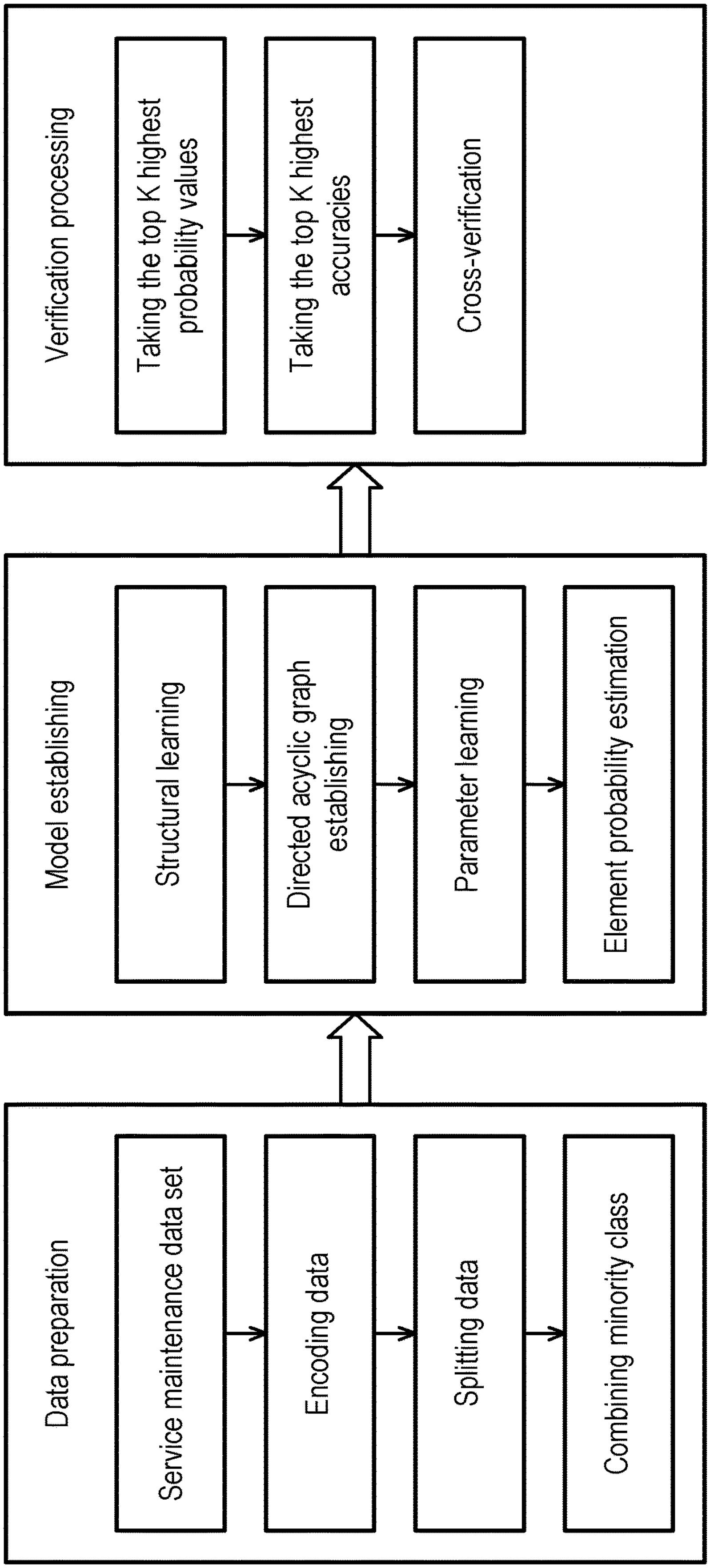
FIG. 3 is a structural diagram of training a probability graph model according to an embodiment of the disclosure.

FIG. 3 is a structural diagram of training a probability graph model according to an embodiment of the disclosure. Referring to FIG. 3, the training of the probability graph model 130 includes three stages, that is, data preparation, model establishing, and verification processing.

In the stage of data preparation, the service maintenance data set is collected first. The source of the service maintenance data set is, for example, project design data, call log data when the machine is sent for repair, BIOS (basic input output system) event log, etc. The design data includes but not limited to: call log data when the machine is sent for repair, field repair data, board return repair data, shipping data, research and development engineer report, design analysis tool (DAT) report, DC power, and product bill of materials (BOM).

Next, the data in the service maintenance data set are encoded, for example, by using one-hot encoding to obtain corresponding numeric values. The encoded data is split into a training data set and a testing data set. For example, 90% of the data in the service maintenance data set is used as a training data set, and 10% of the data is used as a testing data set.

In addition, variable categories are established to classify multiple data in the service maintenance data set. Furthermore, minority classes are further combined, for example, categories with less than 10 classified data items are combined into the same category. For long-tail distribution data, there are many categories that need to be predicted, so the categories with less than 10 data are combined into one.

Figure 4:
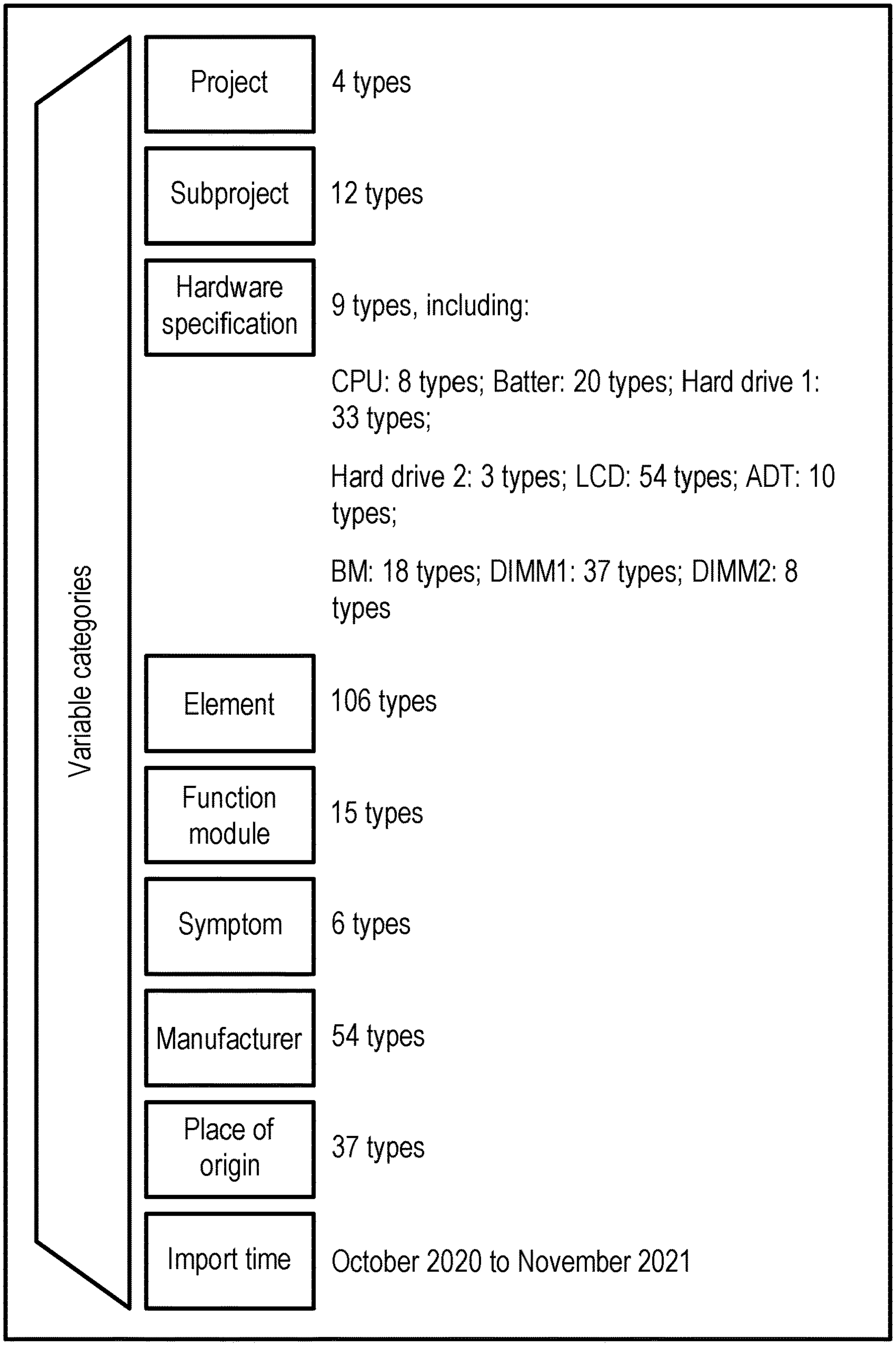
FIG. 4 is a schematic diagram of variable categories according to an embodiment of the disclosure.

FIG. 4 is a schematic diagram of variable categories according to an embodiment of the disclosure. Referring to FIG. 4, the variable categories include project, subproject, hardware specification, element, function module (FM), symptoms, manufacturer, place of origin, import time, etc. Each variable category includes multiple types. As shown in FIG. 4, there are 4 types of projects, for example: “Cyborg”, “Mockingbird”, “SP13”, and “SP15”. There are 9 types of hardware specifications, that is: central processing unit (CPU), battery, hard drive 1 (e.g., a solid state hard drive), hard drive 2 (e.g., a traditional hard drive), liquid-crystal display (LCD), ADT (accelerated display technology) display card, mother board, DIMM1 (dual in-line memory module 1), and DIMM2.

In the stage of model establishing, a probability graph model 130 is established to learn the service maintenance data set through the probability graph model 130, thereby establishing a knowledge graph 135 and a conditional probability distribution (CPD).

For example, structural learning is performed on the probability graph model 130 based on the training data set to obtain a knowledge graph 135. Moreover, based on the training data set and the knowledge graph 135, parameter learning is performed on the probability graph model 130. Afterwards, multiple probability values of multiple factors are calculated through the trained probability graph model 130.

In one embodiment, a directed acyclic graph (DAG) of a Bayesian network is adopted as the knowledge graph 135. Nodes in DAG represent variables, such as observable variables, latent variables, unknown variables, etc. Arrows connecting two nodes indicate that the two variables are causally related. If there is no arrow connecting the two nodes, the two variables are referred to as being conditionally independent of each other. If two nodes are connected with a single arrow, it indicates that one of the nodes is a "parent" and the other is a "descendant or child", and the two nodes will generate a probability value.

In the stage of model establishing, the following is included: structure learning, which is configured to define the relationship between the variable categories (formed of multiple variables) of the service maintenance data set, so as to establish a directed acyclic graph; parameter learning, which is configured to quantify the strength of relationships between variables, thereby establishing conditional probability distributions (CPDs). The role of structural learning is to learn the relationship between variables in the service maintenance history data set of a faulty machine. For example, a service maintenance history data set includes the hardware specification of the faulty machine, the symptoms of the error, which "element" was removed to resolve the symptom, detailed information of the element (e.g., function module, manufacturer, etc.), and the place of origin of the faulty machine. The output of structural learning is a knowledge graph (e.g. DAG) that defines the relationships between all used variables.

The role of parameter learning is to learn the CPD. The CPD describes the strength of each relationship defined in the DAG. It may be known that the parent node corresponds to the quantified CPD impact of the child node. Therefore, when performing estimation/prediction, CPD may be used as the basis for result estimation. This transparency may support and assist relevant technical personnel in maintenance services, who will be able to consider alternatives based on estimated results. In addition, other analyses corresponding to CPD, such as comparative analysis, may also be utilized to improve decision-making.

In the stage of the verification processing, the top K highest probability values are taken among multiple probability values calculated by the probability graph model 130 based on the training data set, and the top K highest accuracies are taken among the probability values calculated by the probability graph model 130 based on the testing data set for cross-verification.

Figure 5A:
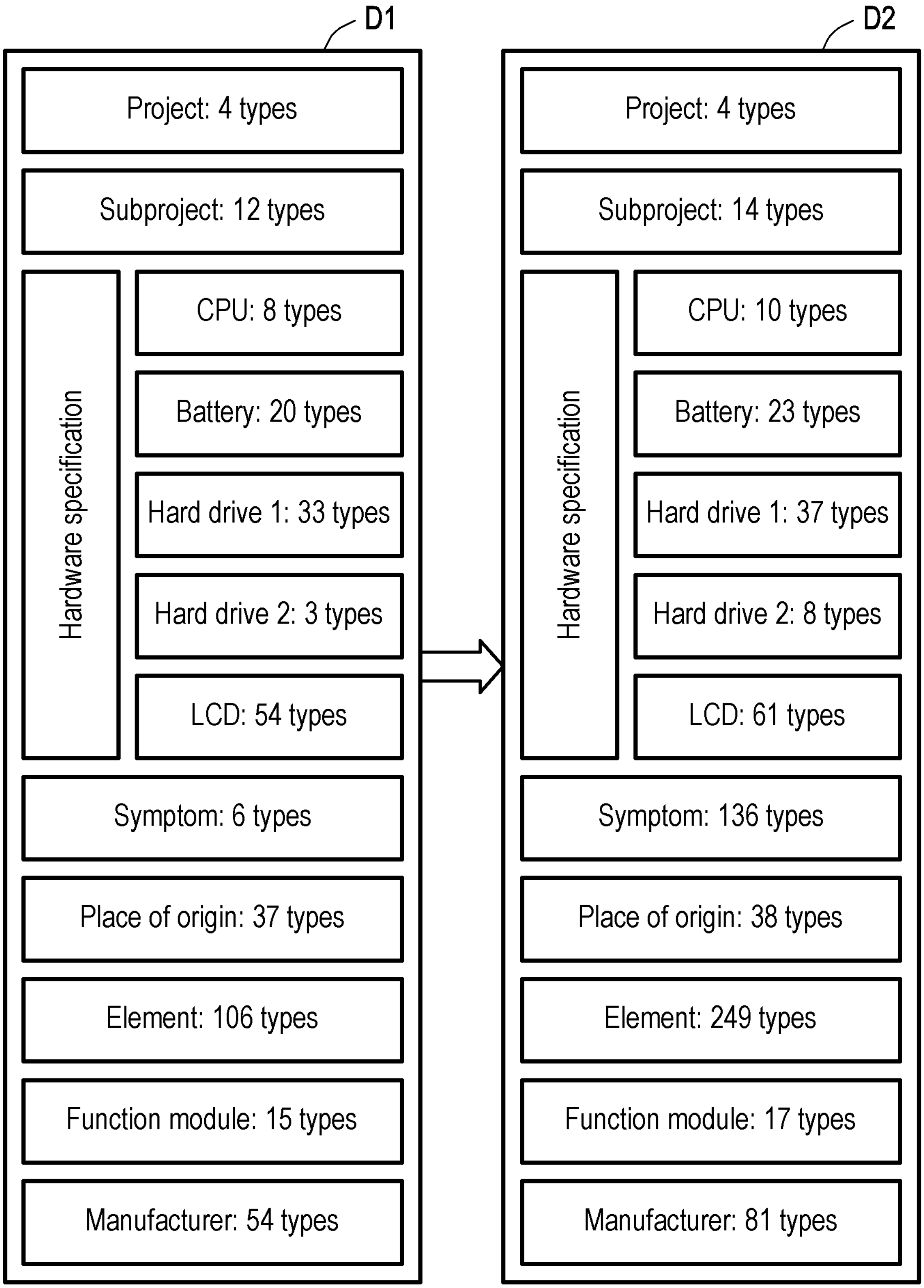
FIG. 5A and FIG. 5B are schematic diagrams of variable setting and structure correlation according to an embodiment of the disclosure.
Figure 5B:
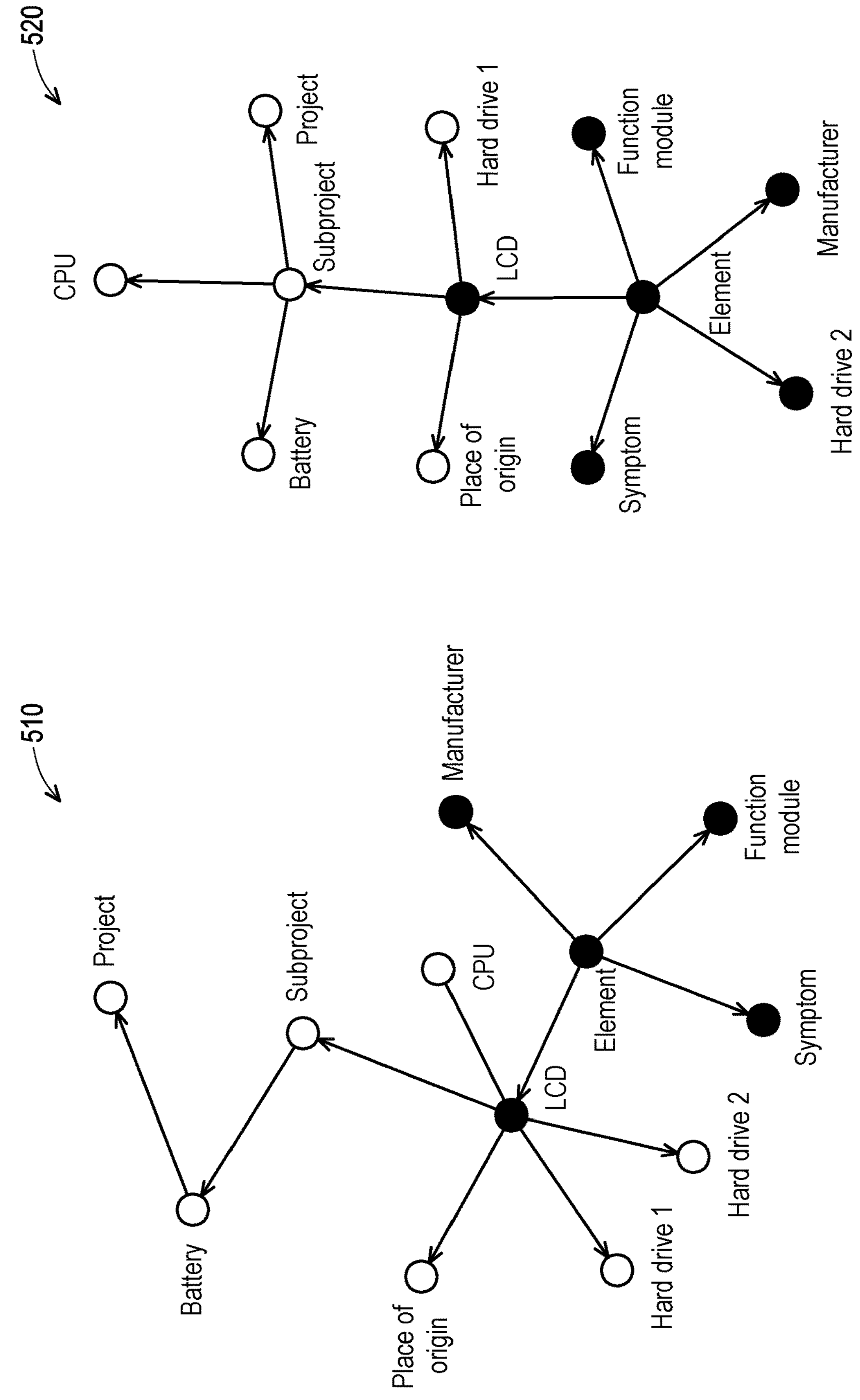

In other embodiments, in order to improve the accuracy, the category of the variable and the variable content (factor) included therein may be further adjusted. For example, the 17 variable categories shown in FIG. 4 are changed to 12 variable categories. For example, in FIG. 4, the hardware specifications were originally 9, but finally adjusted to 5. In addition, the import time was removed. FIG. 5A and FIG. 5B are schematic diagrams of variable setting and structure correlation according to an embodiment of the disclosure. FIG. 5A shows that the addition of the variable data transforms the variable setting D1 into the variable setting D2, and FIG. 5B shows the DAG 510 and the DAG 520 respectively generated based on the variable setting D1 and the variable setting D2. As shown in FIG. 5A and FIG. 5B, variable setting D1 and variable setting D2 both include 12 variable categories, that is: project, subproject, CPU, battery, hard drive 1, hard drive 2, LCD, symptom, place of origin, element, function module, and manufacturer. If the number of types included in the variable categories of the variable setting D1 and the variable setting D2 is different, the structure of the obtained DAG will also be different. DAG 510 is obtained based on the variable setting D1. DAG 520 is obtained based on the variable setting D2.

Returning to FIG. 2, in step S210, the relevant data of the faulty machine is input into the probability graph model 130 through the interactive interface 140, and a recommended factor is obtained. In this embodiment, the knowledge graph 135 is, for example, DAG, which is used to represent the correlation between multiple variable categories. Each variable category includes multiple factors, and the recommended factor is one of the factors included in the recommended category in the variable categories. Different knowledge graphs 135 are obtained from different input data.

In step S215, a search is performed in the knowledge graph 135 to pick up multiple selected categories related to recommended factor among multiple variable categories. Here, the selected categories include the recommended category to which the recommended factor belongs and one or more related categories within other variable categories that have correlation with the recommended category.

Figure 6:
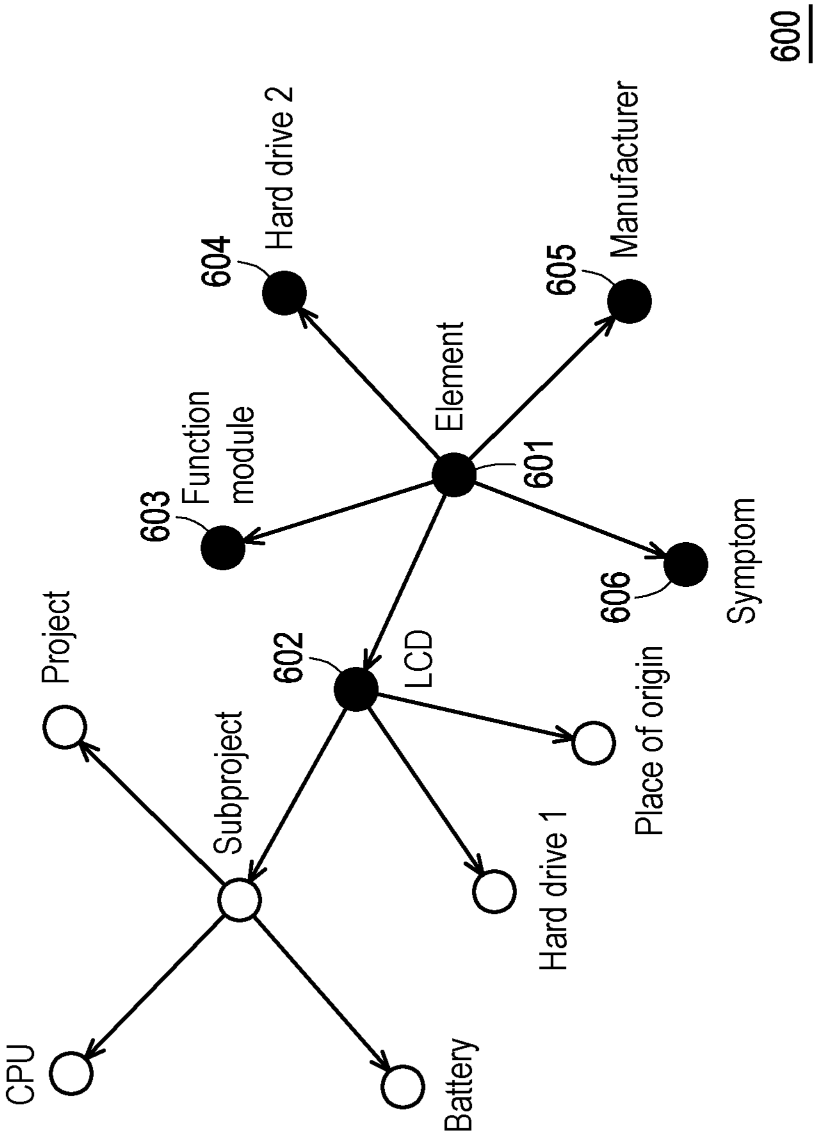
FIG. 6 is a schematic diagram of a DAG according to an embodiment of the disclosure.

FIG. 6 is a schematic diagram of a DAG according to an embodiment of the disclosure. In this embodiment, referring to FIG. 6, the probability graph model 130 is configured to recommend elements to be repaired (recommended factor), so the recommended category is the "element" category. From the DAG 600 shown in FIG. 6, it may be known that the "element" category corresponds to node 601, and nodes 602 to 606 are correlated to node 601. Based on this, the selected categories related to the recommended factor are variable categories corresponding to nodes 601 to 606, including "element", "LCD", "function module", "hard drive 2", "manufacturer", and "symptom". In the DAG 600 shown in FIG. 6, the presented nodes 601 to 606 are respectively a variable category set. In addition, multiple nodes corresponding to all factors may also be presented in one exploded diagram.

Next, in step S220, based on the importance of the selected category, a hierarchical structure diagram is established and displayed on the interactive interface 140. Here, the hierarchical structure diagram includes multiple hierarchies corresponding to the selected categories, each of the hierarchies has multiple nodes corresponding to the factors included in the corresponding selected categories. For example, in the data collection stage, relevant technical personnel may be consulted to determine, for different recommended factors, the importance of their corresponding strongly related variable categories. In the model learning stage, the variable of importance is added for learning.

In one embodiment, the hierarchical structure graph is, for example, a causal tree. The root node of the causal tree indicates the beginning of origin and does not correspond to any variable category. The variable category with higher importance is set at a hierarchy closer to the root node. For example, assuming that the order of importance from high to low is: "function module", "symptom", "manufacturer", "element", "LCD", "hard drive 2", then the first hierarchy to the sixth hierarchy starting from the root node are respectively set as "function module", "symptom", "manufacturer", "element", "LCD", and "hard drive 2".

Afterwards, in response to a selection of one of the nodes included in the hierarchies, in the hierarchical structure diagram, a connection relationship is visually presented between the selected node and a corresponding parent node in the previous hierarchy.

Figure 7:
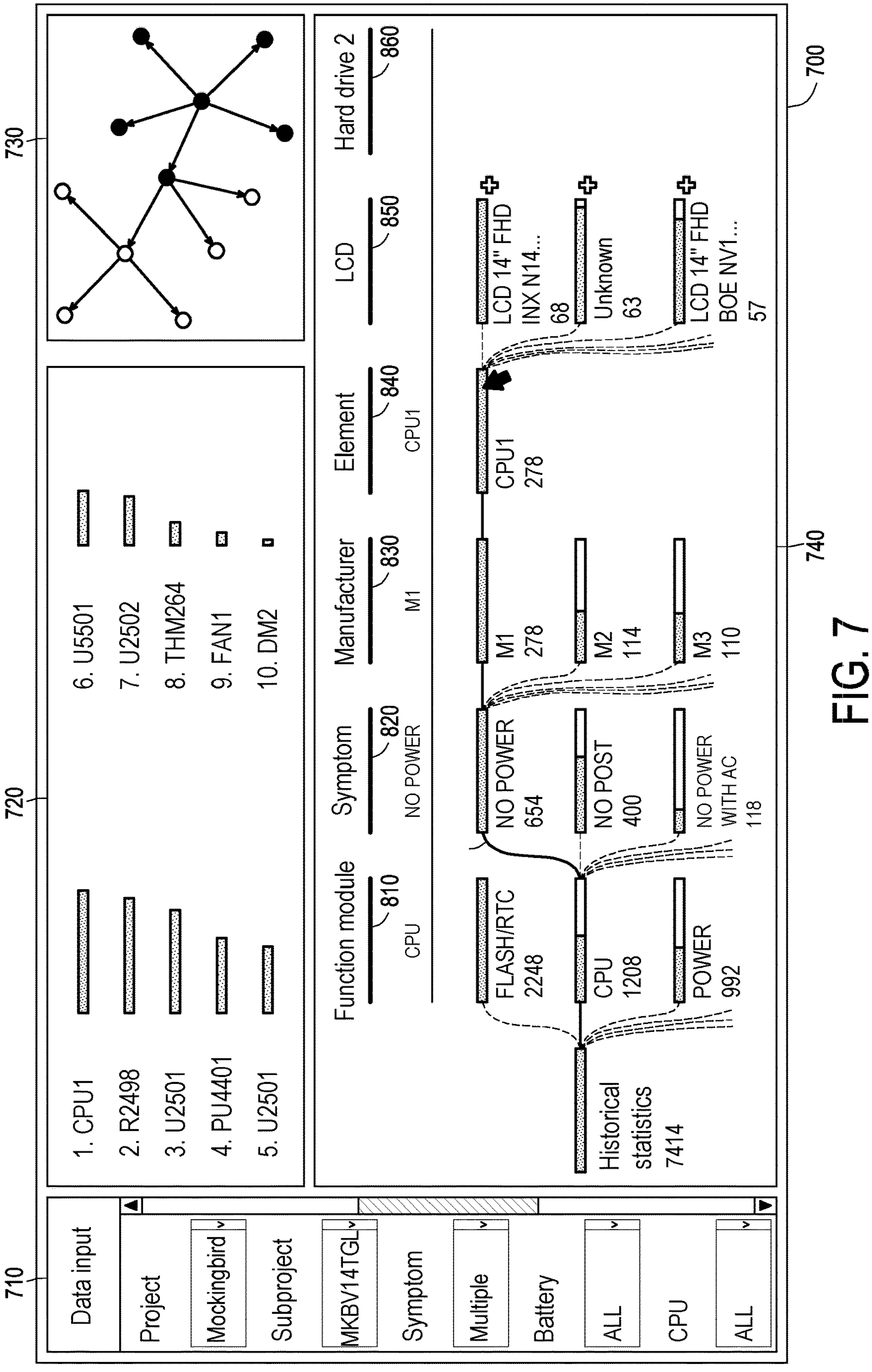
FIG. 7 is a schematic diagram of a presentation screen of an interactive interface according to an embodiment of the disclosure.

FIG. 7 is a schematic diagram of a presentation screen of an interactive interface according to an embodiment of the disclosure. Referring to FIG. 7, the presentation screen 700 of the interactive interface 140 includes multiple areas 710 to 740. The area 710 is configured for the user to input relevant information of the faulty machine. The area 720 is configured to present the recommended ranking of the representative factors. The area 730 is configured to present a DAG (DAG 600 shown in FIG. 6). The area 740 is configured to present a hierarchical structure diagram.

In one embodiment, the area 710 respectively sets multiple selection fields according to multiple variable categories. The user selects "Mockingbird" in the project field in area 710, selects "MKBV14TGL" in the subproject field, and selects multiple factors in the symptom field, such as "No Boot", "No POST (power-on self-test)", "No Power", "No AC adapter" for power supply, and "No Battery".

The area 720 is configured to present the recommended ranking of the representative factors. Multiple probability values of multiple factors included in the recommended category are calculated through the probability graph model 130. Multiple representative factors are taken from the factors in the manner of numerically high to low based on the probability values. For example, the top 10 factors with high probability values are taken. In the area 720 of the presentation screen 700, the representative factors are sorted and displayed. Among these representative factors, the one with the highest probability value is taken as the final recommended factor. In this embodiment, the probability value is represented by a bar graph. In other embodiments, the percentage of the historical statistics may be further displayed in the area 720.

FIG. 8A to FIG. 8D are schematic diagrams on how to expand a hierarchical structure diagram according to an embodiment of the disclosure. In this embodiment, it is assumed that the recommended element to be repaired (recommended factor) obtained through the probability graph model 130 is "CPU1". In terms of the DAG 600 shown in FIG. 6, the selected categories strongly related to the element to be repaired "CPU1" are "element" (the variable category to which the element to be repaired "CPU1" belongs), "LCD", "function module", "hard drive 2", "manufacturer", and "symptoms". The inheritance relationship of the hierarchies is determined according to the importance of the selected category. For example, the hierarchies 810 to 860 are respectively set as "function module", "symptom", "manufacturer", "element", "LCD", and "hard drive 2". Furthermore, the inheritance relationship between the factors included in each selected category is determined according to the DAG obtained by the probability graph model 130.

The root node R is displayed in the hierarchical structure diagram 800 to represent the historical statistical total calculated by the processor 110 in the training data set based on the selection of the area 710. For example, assuming that the user selects the project "Mockingbird", the subproject "MKBV14TGL" and several symptoms through the fields in the area 710, the processor 110 finds the data in the training data set that meet the above selection to calculate the historical statistics total.

Figure 8A:
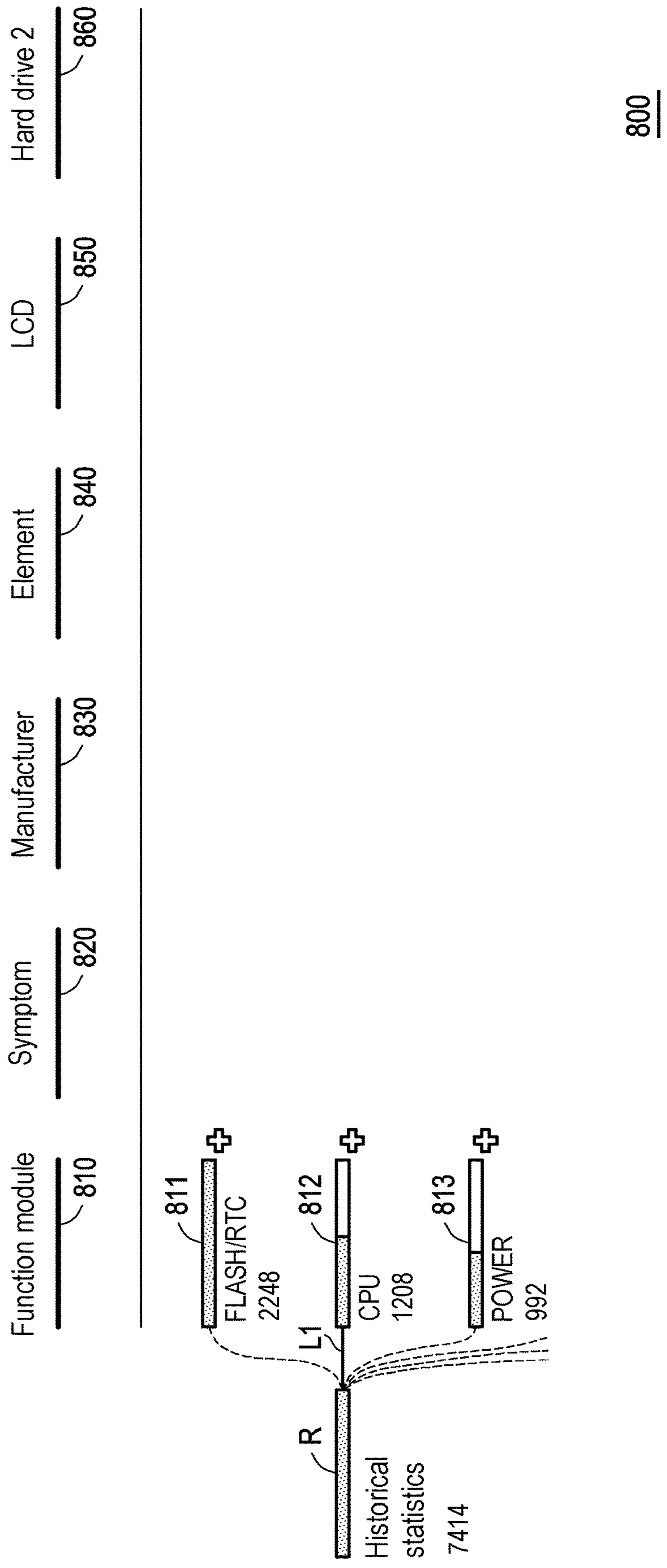
FIG. 8A to FIG. 8D are schematic diagrams on how to expand a hierarchical structure diagram according to an embodiment of the disclosure.

After inputting the relevant data of the faulty machine to the probability graph model 130 through the presentation screen 700 to obtain the DAG 600 and the element to be repaired "CPU1" (recommended factor), as shown in FIG. 8A, the root node R, the hierarchies 810 to 860, and the expanded results of the hierarchy 810 as the first hierarchy may be displayed in the hierarchical structure diagram 800 first. Here, only three representative nodes 811 to 813 in the hierarchy 810 are listed.

Specifically, for the hierarchy 810 (the first hierarchy), the processor 110 respectively calculates the historical statistics of multiple factors included in the corresponding variable category "function module". For example, in terms of the function module "FLASH/RTC", the data corresponding to the project "Mockingbird", the subproject "MKBV14TGL", multiple symptoms, and the function module "FLASH/RTC" are found in the training data set to calculate the historical statistics as 2248. After the historical statistics of each factor in the variable category "function module" are calculated, the nodes 811 to 813 corresponding to the first three highest historical statistics are displayed in the fields corresponding to the hierarchy 810.

In addition, the symbol "+" shown in FIG. 8A to FIG. 8D indicates that the corresponding node has a corresponding node set that may be expanded at the next hierarchy. In response to a selection of one of the nodes, a connection relationship is visually presented between the selected node and a corresponding parent node in the previous hierarchy. A node set corresponding to the selected node included in the next hierarchy of the selected node is expanded.

Figure 8B:
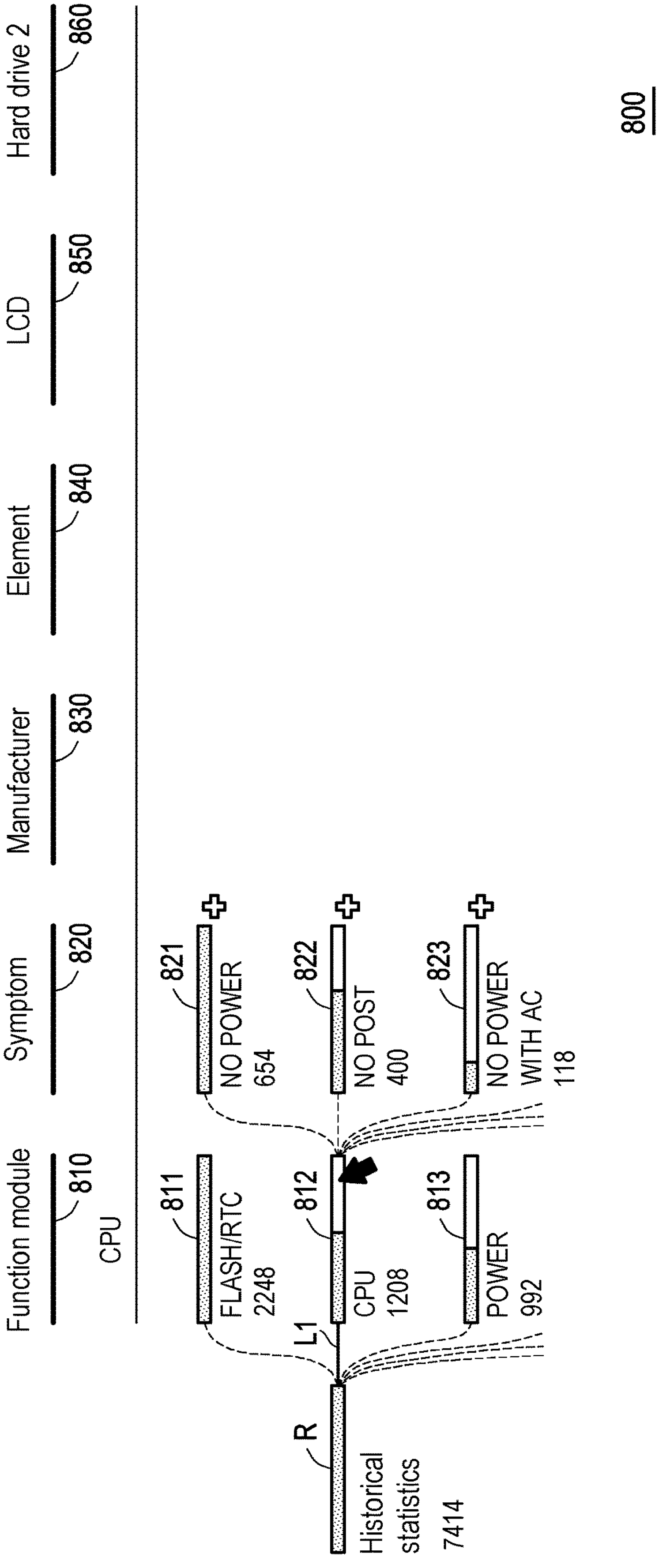

As shown in FIG. 8B, in response to the node 812 being selected, the connection relationship between the node 812 and the root node R is visually presented. For example, the root node R and the node 812 are connected by a connection line L1. At the same time, the next hierarchy of the node 812 is expanded, that is, the node set corresponding to the selected node 812 included in the hierarchy 820 is expanded. Multiple (three herein) representative nodes (i.e., nodes 821 to 823) are selected from the node set and presented in the hierarchical structure diagram 800 based on historical statistics of each of the nodes in the node set. The sum of the historical statistics of all nodes corresponding to the node set in the hierarchy 820 at node 812 is equal to the historical statistics of node 812.

Figure 8C:
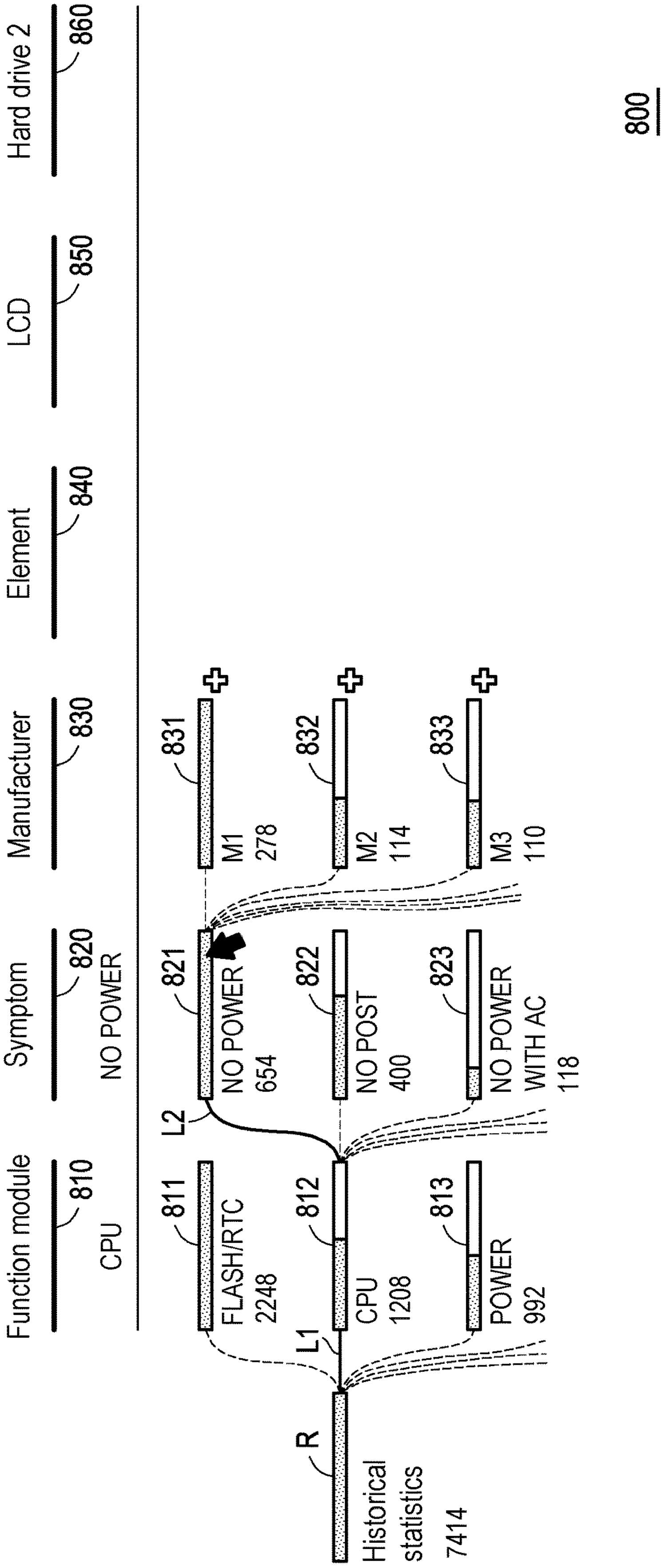
Figure 8D:
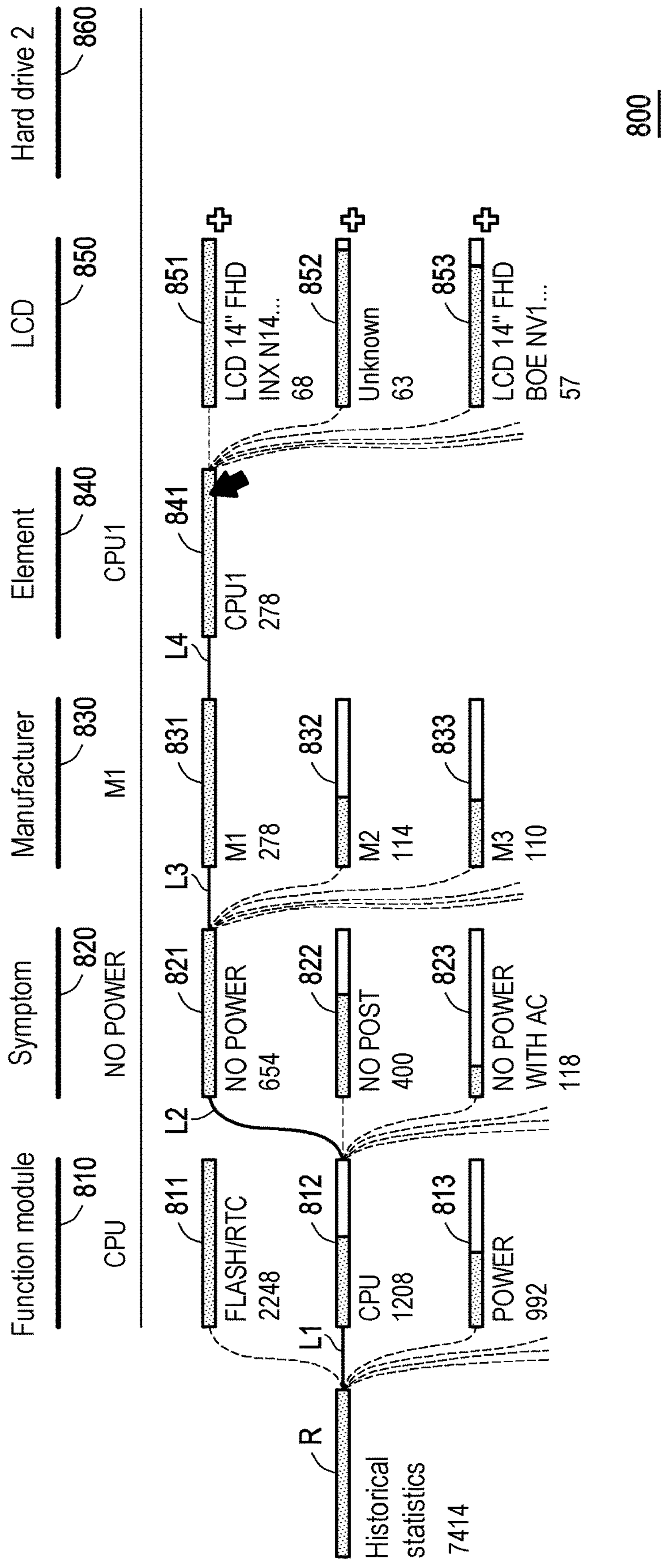

Next, as shown in FIG. 8C, in response to the node 821 being selected, the node 812 and the node 821 are connected by a connection line L2. At the same time, the next hierarchy of the node 821 is expanded, that is, the node set corresponding to the selected node 821 included in the hierarchy 830 is expanded. Multiple (three herein) representative nodes (i.e., nodes 831 to 833) are selected from the node set and presented in the hierarchical structure diagram 800 based on historical statistics of each of the nodes in the node set. By analogy, the node 831 is selected in the hierarchy 830, the node 841 is selected in the hierarchy 840, and the result shown in FIG. 8D is obtained.

The Hierarchical structure diagram 800 is, for example, a causal tree whose purpose is to facilitate the explainability of predictions by looking at causal relationships. In addition, the hierarchical structure diagram 800 may also serve as a basis for determining the root cause of the problem.

For example, if a technical personnel wishes to check what may be improved in the function module "CPU", he may select the node 812 corresponding to the function module "CPU", and find that the symptom "NO POWER" has the highest historical statistics. Next, the node 821 corresponding to the symptom "NO POWER" is selected, and it may be found that the manufacturer "Ml" has the highest historical statistics. Afterwards, the node 831 corresponding to the manufacturer "Ml" is selected, and it is found that only one element "CPU1" is included. Then the node 841 corresponding to the element "CPU1" is selected, and it may be found that the LCD model "LCD 14" FHX INX N140HCA-EAC" has the highest historical statistics.

In the case where the element "CPU1" is an element to be repaired, based on the above hierarchical structure diagram 800, the technical personnel may analyze the detailed information of the element "CPU1" to investigate potential causes. For example, a technician may check the material quality of the sole manufacturer "Ml" of the element "CPU1". Alternatively, the technical personnel checks whether the element "CPU1" has a higher case frequency in "LCD 14" FHX INX N140HCA-EAC", and the technical personnel may also investigate whether the subproject "MKBV14TGL" of the project "Mockingbird" has potential assembly problems or other elements/factors that are not compatible with element "CPU1". The hierarchical architecture diagram 800 facilitates the technical personnel to determine the root cause and possible solution of the problem.

Figure 9:
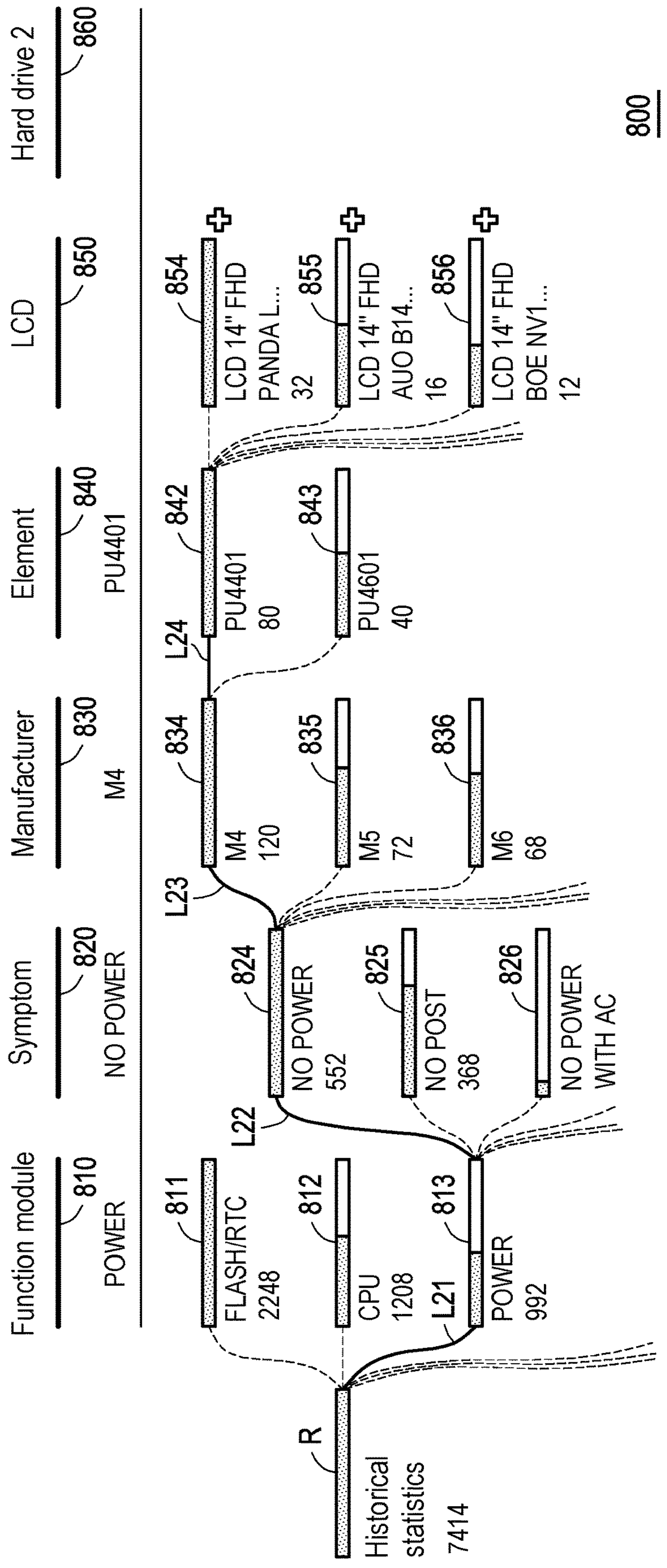
FIG. 9 is a schematic diagram of an expanded result of a hierarchical structure diagram according to another embodiment of the disclosure.

FIG. 9 is a schematic diagram of an expanded result of a hierarchical structure diagram according to another embodiment of the disclosure. The embodiment shown in FIG. 9 is another expanded result of the embodiment shown in FIG. 8A to FIG. 8D. Referring to FIG. 9, first, in the hierarchy 810, the node 813 is selected, the root node R and the node 813 are connected with the connection line L21, and the next hierarchy of the node 813 is expanded, that is, the nodes 824 to 826 corresponding to the hierarchy 820 are expanded. Next, the node 824 is selected, the node 813 and the node 824 are connected with the connection line L22, and the next hierarchy of the node 824 is expanded, that is, the nodes 834 to 836 corresponding to the hierarchy 830 are expanded. Afterwards, the node 834 is selected, the node 824 and the node 834 are connected with the connection line L23, and the next hierarchy of the node 834 is expanded, that is, the nodes 842 to 843 corresponding to the hierarchy 840 are expanded. Then, the node 842 is selected, the node 834 and the node 842 are connected with the connection line L24, and the next hierarchy of the node 842 is expanded, that is, the nodes 854 to 856 corresponding to the hierarchy 850 are expanded. Each hierarchy are expanded by analogy.

In the expanded results shown in FIG. 9, if a technical personnel wishes to check what may be improved in the function module "POWER", he may select the node 813 corresponding to the function module "POWER", and find that the symptom "NO POWER" has the highest historical statistics. In hierarchy 830, it may be seen that the manufacturer "M4" has the highest historical statistics, and it includes two types of elements "PU4401" and "PU4601" in the next hierarchy. Thus, technical personnel may determine that both types of elements are prone to internal damage. If improvements are to be made, it is necessary to further analyze whether its corresponding manufacturer "M4" has problems in the procurement process, in the assembly process of elements, or in the storage of unsuitable elements. Technical personnel may also check if the type of LCD is a problem affecting machine damage through the hierarchy 850. For example, whether the type of LCD is compatible with the element to be repaired is analyzed.

The hierarchical structure diagram 800 derived from the nodes 601 to 606 in the DAG 600 may facilitate technical personnel in understanding the causal relationship and finding the root cause of the problem. By analyzing variable categories such as "function module," "manufacturer," and "LCD," technical personnel may determine whether the problem stems from procurement, assembly, storage, or element compatibility. This presentation screen 700 facilitates analysis for suggestions and improvements to the maintenance process.

In one embodiment, the interactive interface 140 further provides a comparison page to compare results between different variable categories. Specifically, through the comparison page, a first factor and a second factor are selected in the first category of the variable categories, and a third factor is selected in the second category of the variable categories. The first factor and the third factor are input into the probability graph model 130, and multiple first probability values of the factors included in a third category among the variable categories are obtained. The second factor and the third factor are input into the probability graph model 130, and multiple second probability values of the factors included in the third category are obtained. Afterwards, the first probability value and the second probability value are displayed on the comparison page.

Figure 10:
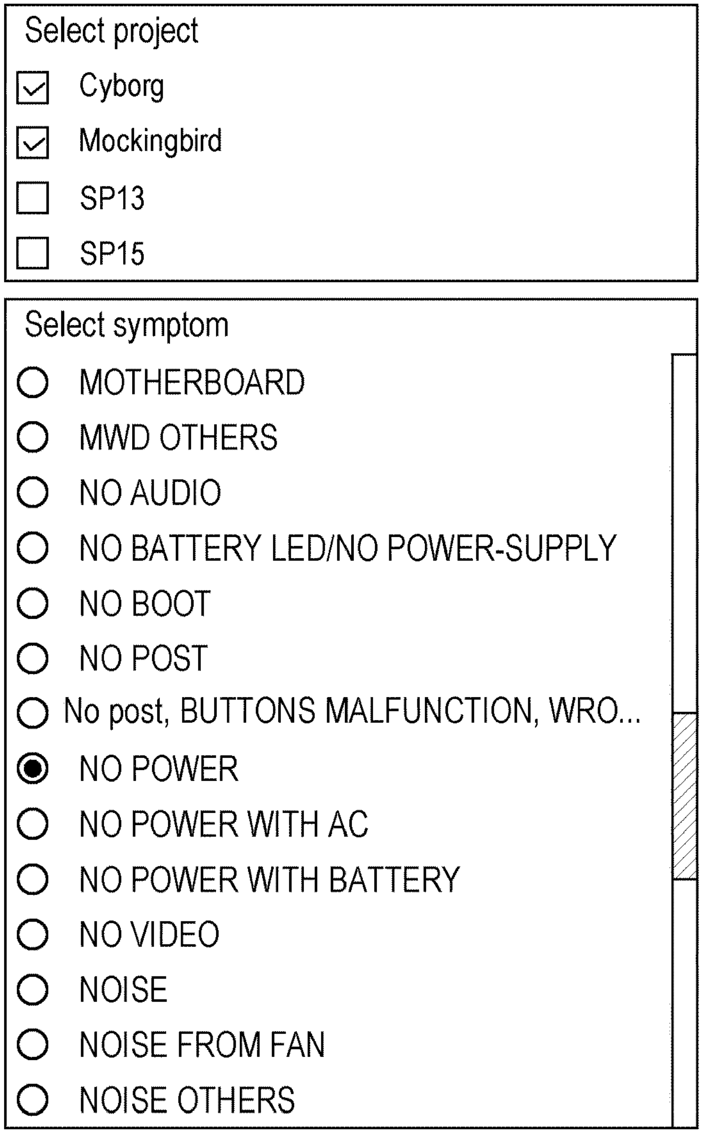
FIG. 10 is a schematic diagram of a comparison page according to an embodiment of the disclosure.

FIG. 10 is a schematic diagram of a comparison page according to an embodiment of the disclosure. Referring to FIG. 10, technical personnel may analyze through the comparison page 1000 in order to find the amount of symptom "NO POWER" that may be reduced. Therefore, in the comparison page 1000, the technical personnel selects the project "Mockingbird" and the project "Cyborg" (first factor, second factor) in the variable category "project" (first category), and selects the symptom "NO POWER" (third factor) in the variable category "symptoms" (second category).

Based on the selection, the probability values of each variable (factor) corresponding to the variable category "function module" (third category) for both the project "Mockingbird" and the project "Cyborg", as well as the ratio of each variable for the two categories are displayed in the comparison page 1000. For example, in terms of the function module "INT IO" (factor), the probability value of the project "Mockingbird" is 0.029764, the probability value of the project "Cyborg" is 0.025276, and the ratio of the two is 0.029764/0.025276.

The higher the ratio, the greater the probability that the element to be repaired will fail in the project "Mockingbird" project compared to the project "Cyborg". The closer the ratio is to 0, the greater the probability that the element to be repaired will fail in the project "Cyborg" project compared to the project "Mockingbird".

As shown in FIG. 10, the highest ratio is the function module "Flash/RTC", which indicates that the probability of damage to the element to be repaired in the project "Mockingbird" is much higher than that in the project "Cyborg". It may be inferred from this that the defect problem of the elements to be repaired may be highly related to the machine type. If the assembly processes of the project "Mockingbird" and the project "Cyborg" are different, it may be inferred that the defect problem of "element to be repaired" may be related to the assembly process. Alternatively, assuming that element A exists in the project "Mockingbird", but element A does not exist in the project "Cyborg", it may be inferred that the element to be repaired may not be compatible with element A.

In addition, when the ratio is close to 1 or is 1, it indicates that the element to be repaired is not related to the variable category "project", and the element to be repaired may be broken no matter which project it is in. Afterwards, another variable category is selected for comparison, such as "manufacturer", to further analyze whether there is a problem with the quality of the material. In addition, if the damage problem is not related to the element, then the similarity of the assembly process, features, or elements between different projects may be analyzed to determine whether there is a problem with the assembly process or whether there is an incompatibility problem.

When the ratio is close to 0, taking the function module "GPU1" as an example, the ratio is close to 0, which indicates that the probability of damage to the element to be repaired in the project "Cyborg" is much higher than that in the project "Mockingbird".

Figure 11:
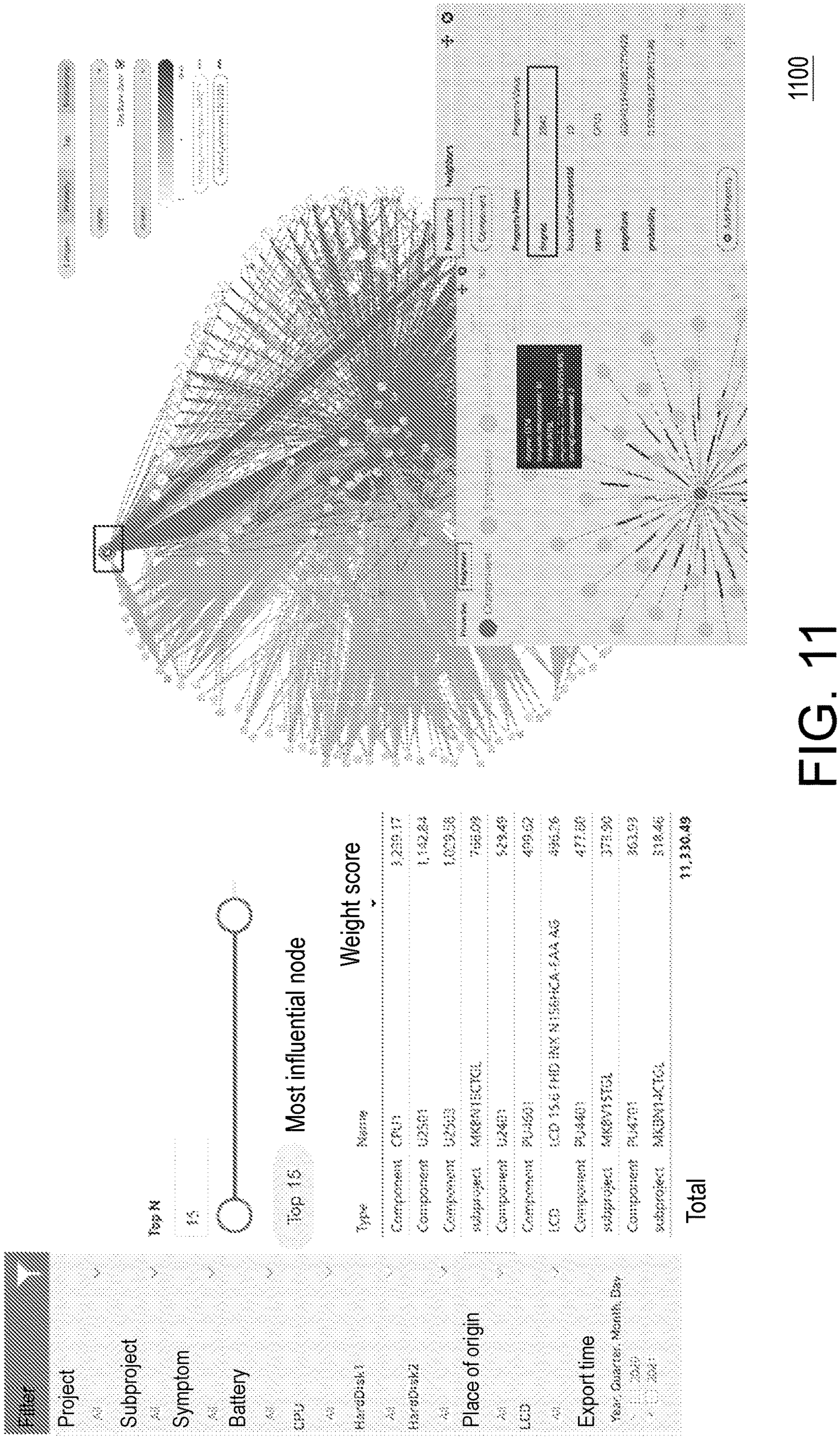
FIG. 11 is a schematic diagram of a visual presentation provided by a degree centrality algorithm according to an embodiment of the disclosure.

FIG. 11 is a schematic diagram of a visual presentation provided by a degree centrality algorithm according to an embodiment of the disclosure. The degree centrality algorithm is a tool that may be configured to identify popular nodes in a given graph, measuring the number of incoming or outgoing relations from a node according to the relation projection direction.

Referring to FIG. 11, an analysis page 1100 utilizes a degree centrality algorithm combining big data and graph algorithm to identify key nodes that need to be improved in the data. The analysis page 1100 displays the most influential nodes (table on the left), indicating the nodes that should be improved first.

The top N influential nodes may be found through the analysis page 1100. For example, it is selected to find the top 11, and the corresponding weight score is calculated. In this embodiment, the element "CPU1" has the highest connection degree. The technical personnel may further analyze the graph on the right side of the analysis page 1100 to see the correlation between elements, manufacturers and symptoms. For example, by clicking a node, the corresponding properties and neighbors information are displayed. The properties column is configured to indicate the algorithm value, node name, probability value, etc. of the graph algorithm. The neighbors column is configured to indicate connections to the selected nodes (symptom and manufacturer) and their scores.

Based on FIG. 8D, when analyzing the element "CPU1", it only has a unique manufacturer "Ml". In other cases, for example, the element "PU4401" shown in FIG. 9 involves 2 manufacturers, so by respectively analyzing the connectivity and shared features of the two with the element "PU4401" (using Louvain community detection), it may facilitate in identifying potential causes of defects. This approach enables technical personnel to determine the priority of improvements and gain a deep understanding of potential issues within the network.

To sum up, the disclosure utilizes a trained probability graph model to establish a knowledge graph and estimate a recommended factor, and finds selected categories that are strongly related to the recommended factor based on the knowledge graph, and generates a hierarchical structure diagram. A hierarchical structure diagram facilitates the explainability of predictions by looking at causal relationships, and may also serve as a basis for determining the root cause of problems. Based on this, relevant personnel may detect the cause of machine damage. Accordingly, it may not only be used to recommend or give prediction results, but also perform causal inference to further assist technical personnel in the service maintenance process.

What is claimed is:

1. A maintenance service recommendation method, adapted to be executed by using a processor, the maintenance service recommendation method comprising:

providing a probability graph model that is trained and a knowledge graph;

inputting relevant data of a faulty machine into the probability graph model and obtaining a recommended factor, wherein the knowledge graph is configured to represent a correlation between a plurality of variable categories, each of the variable categories comprises a plurality of factors, and the recommended factor is one of the factors comprised in a recommended category in the variable categories;

performing a search in the knowledge graph to pick up a plurality of selected categories related to the recommended factor among the variable categories; and establishing a hierarchical structure diagram and displaying on an interactive interface based on an importance of each of the selected categories, wherein the hierarchical structure diagram comprises a plurality of hierarchies corresponding to the selected categories, each of the hierarchies has a plurality of nodes corresponding to the factors comprised in each of the selected categories.

2. The maintenance service recommendation method according to claim 1, further comprising:

performing structural learning on the probability graph model based on a training data set to obtain the knowledge graph;

executing parameter learning on the probability graph model based on the training data set and the knowledge graph; and executing cross-verification on the probability graph model based on a testing data set.

3. The maintenance service recommendation method according to claim 1, wherein establishing the hierarchical structure diagram further comprises:

determining an inheritance relationship of the hierarchies based on the importance of each of the selected categories.

4. The maintenance service recommendation method according to claim 1, wherein after establishing the hierarchical structure diagram and displaying on the interactive interface, further comprises:

in response to a selection of one of the nodes comprised in the hierarchies, in the hierarchical structure diagram, visually presenting a connection relationship between the selected node and a corresponding parent node in previous hierarchy.

5. The maintenance service recommendation method according to claim 4, wherein in response to the selection of one of the nodes comprised in the hierarchies, further comprises:

expanding a node set comprised in next hierarchy of the selected node; and selecting a plurality of representative nodes from the node set and presenting in the hierarchical structure diagram based on historical statistics of each of the nodes in the node set.

6. The maintenance service recommendation method according to claim 5, further comprising:

respectively displaying corresponding historical statistics for each of the nodes presented in the hierarchical structure diagram.

7. The maintenance service recommendation method according to claim 1, wherein after inputting the relevant data of the faulty machine into the probability graph model through the interactive interface, further comprises:

calculating a plurality of probability values of the factors comprised in the recommended category through the probability graph model;

taking a plurality of representative factors from the factors in a manner of numerically high to low based on the probability values; and sorting and displaying the representative factors in the interactive interface, wherein a representative factor among the representative factors with highest probability value is taken as a final recommended factor.

8. The maintenance service recommendation method according to claim 1, wherein the interactive interface comprises a comparison page, and the maintenance service recommendation method further comprises:

selecting a first factor and a second factor in a first category of the variable categories and selecting a third factor in a second category of the variable categories through the comparison page;

inputting the first factor and the third factor into the probability graph model, and obtaining a plurality of first probability values of a plurality of factors comprised in a third category of the variable categories through a first knowledge graph;

inputting the second factor and the third factor into the probability graph model, and obtaining a plurality of second probability values of the factors comprised in the third category of the variable categories through a second knowledge graph; and displaying the first probability values and the second probability values in the comparison page.

9. The maintenance service recommendation method according to claim 1, wherein the knowledge graph is a directed acyclic graph, and the probability graph model is established by adopting a Bayesian network.

10. An electronic apparatus, comprising:

a memory, comprising a probability graph model that is trained, a knowledge map, and an interactive interface; and a processor, coupled to the memory and configured to:

input relevant data of a faulty machine into the probability graph model through the interactive interface and obtain a recommended factor, wherein the knowledge graph represents a correlation between a plurality of variable categories, each of the variable categories comprises a plurality of factors, and the recommended factor is one of the factors comprised in a recommended category in the variable categories;

perform a search in the knowledge graph to pick up a plurality of selected categories related to the recommended factor among the variable categories; and establish a hierarchical structure diagram and display on the interactive interface based on an importance of each of the selected categories, wherein the hierarchical structure diagram comprises a plurality of hierarchies corresponding to the selected categories, each of the hierarchies has a plurality of nodes corresponding to the factors comprised in each of the selected categories.

11. The electronic apparatus according to claim 10, wherein the processor is configured to:

perform structural learning on the probability graph model based on a training data set to obtain the knowledge graph;

execute parameter learning on the probability graph model based on the training data set and the knowledge graph; and execute cross-verification on the probability graph model based on a testing data set.

12. The electronic apparatus according to claim 10, wherein the processor is configured to:

determine an inheritance relationship of the hierarchies based on the importance of each of the selected categories.

13. The electronic apparatus according to claim 10, wherein after establishing the hierarchical structure diagram and displaying on the interactive interface, the processor is configured to:

in response to a selection of one of the nodes comprised in the hierarchies, in the hierarchical structure diagram, visually present a connection relationship between the selected node and a corresponding parent node in previous hierarchy.

14. The electronic apparatus according to claim 13, wherein in response to the selection of one of the nodes comprised in the hierarchies, the processor is configured to:

expand a node set comprised in next hierarchy of the selected node; and select a plurality of representative nodes from the node set and presenting in the hierarchical structure diagram based on historical statistics of each of the nodes in the node set.

15. The electronic apparatus according to claim 14, wherein the processor is configured to:

respectively display corresponding historical statistics for each of the nodes presented in the hierarchical structure diagram.

16. The electronic apparatus according to claim 10, wherein the processor is configured to:

calculate a plurality of probability values of the factors comprised in the recommended category through the probability graph model;

take a plurality of representative factors from the factors in a manner of numerically high to low based on the probability values; and sort and display the representative factors in the interactive interface, wherein a representative factor among the representative factors with highest probability value is taken as a final recommended factor.

17. The electronic apparatus according to claim 10, wherein the interactive interface comprises a comparison page, and the processor is configured to:

select a first factor and a second factor in a first category of the variable categories and select a third factor in a second category of the variable categories through the comparison page;

input the first factor and the third factor into the probability graph model, and obtain a plurality of first probability values of a plurality of factors comprised in a third category of the variable categories through a first knowledge graph;

input the second factor and the third factor into the probability graph model, and obtain a plurality of second probability values of the factors comprised in the third category of the variable categories through a second knowledge graph; and display the first probability values and the second probability values in the comparison page.

18. The electronic apparatus according to claim 10, wherein the knowledge graph is a directed acyclic graph, and the probability graph model is established by adopting a Bayesian network.

19. A non-transitory computer-readable recording medium, configured to store a program code, a probability graph model that is trained, a knowledge map, and an interactive interface, wherein when the program code is executed by a processor, the processor executes:

inputting relevant data of a faulty machine into the probability graph model and obtaining a recommended factor through the interactive interface, wherein the knowledge graph represents a correlation between a plurality of variable categories, each of the variable categories comprises a plurality of factors, and the recommended factor is one of the factors comprised in a recommended category in the variable categories;

performing a search in the knowledge graph to pick up a plurality of selected categories related to the recommended factor among the variable categories; and establishing a hierarchical structure diagram and displaying on the interactive interface based on the selected categories and an importance of each of the selected categories, wherein the hierarchical structure diagram comprises a plurality of hierarchies corresponding to the selected categories, each of the hierarchies has a plurality of nodes corresponding to the factors comprised in each of the selected categories.

* * * * *